Figure 8:
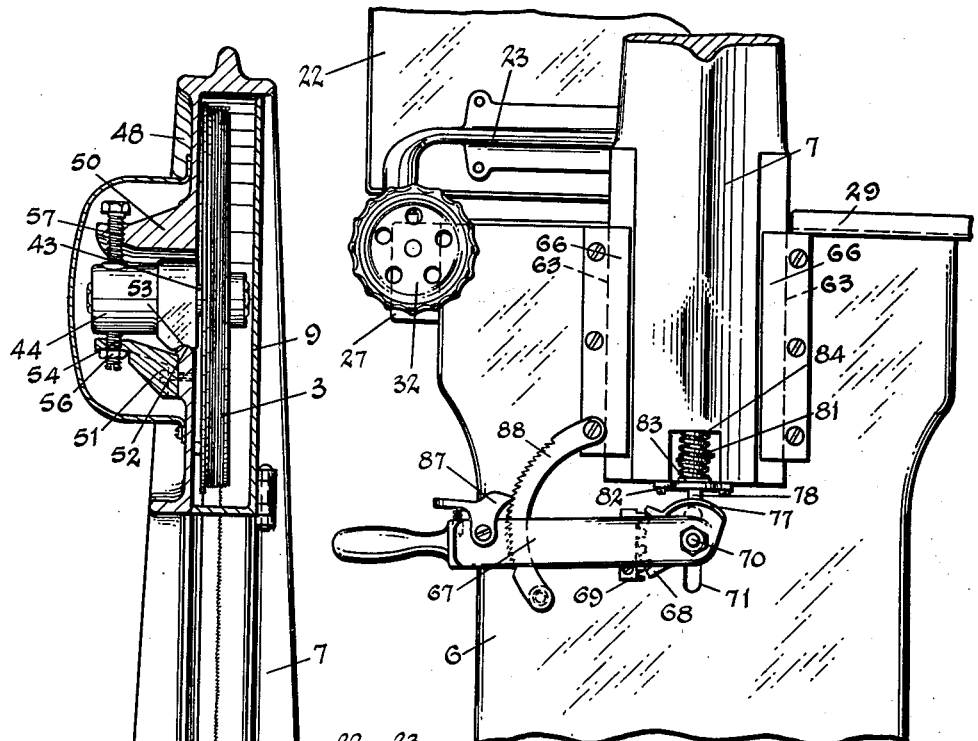

May 18, 1937.  C. G. BIRO  2,081,033
MEAT CUTTING AND SLICING MACHINE
Filed Feb. 27, 1936  3 Sheets-Sheet 1
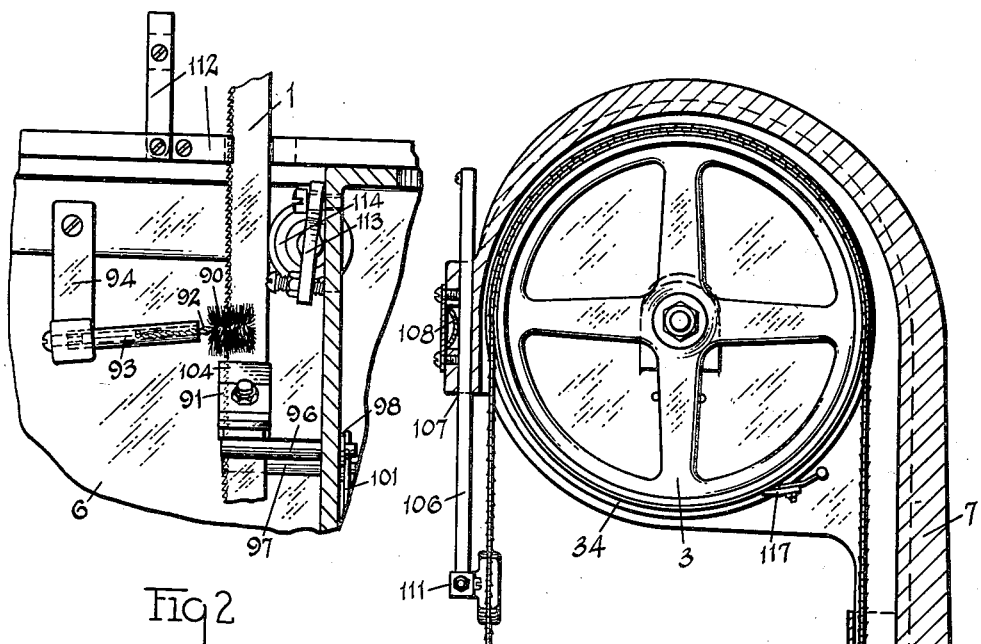
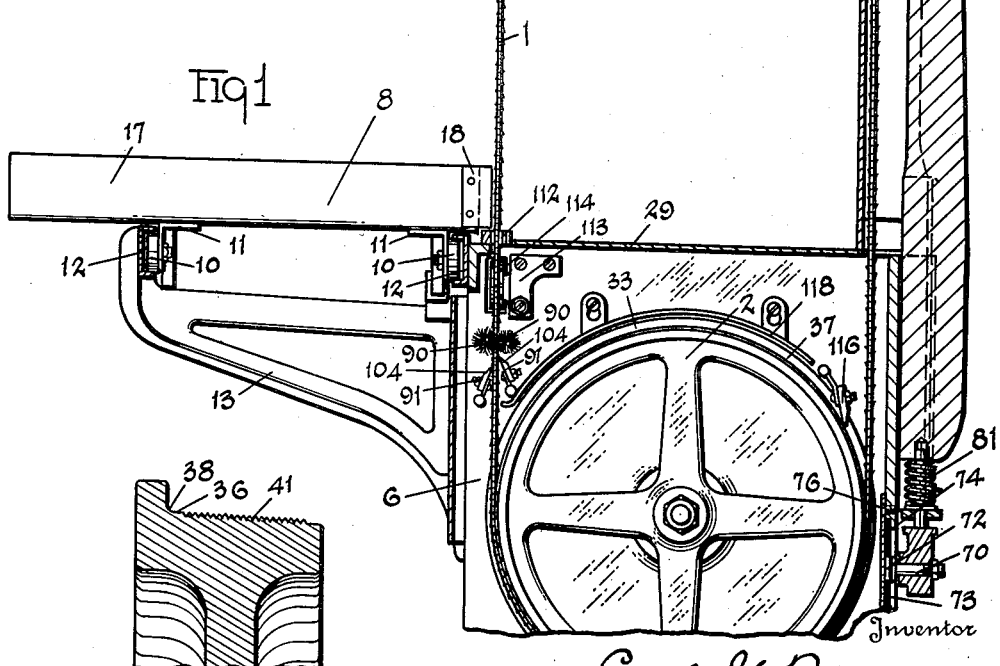
Inventor
Carl G. Biro
By Faust F. Crampton
Attorney May 18, 1937.  C. G. BIRO  2,081,033
MEAT CUTTING AND SLICING MACHINE
Filed Feb. 27, 1936   3 Sheets-Sheet 2
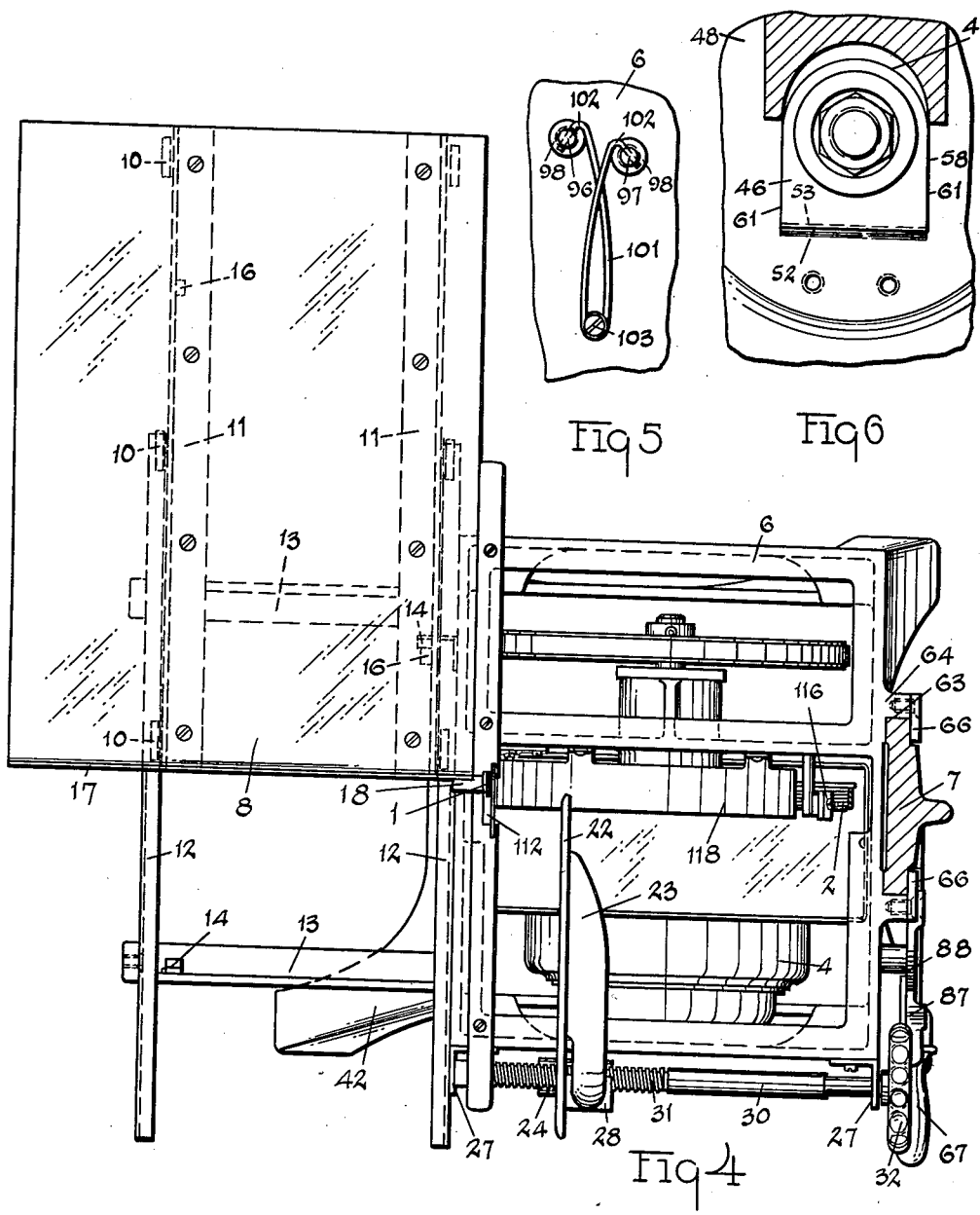
Inventor
Carl G. Biro
By Faust F. Crampton
Attorney May 18, 1937.  C. G. BIRO  2,081,033
MEAT CUTTING AND SLICING MACHINE
Filed Feb. 27, 1936  3 Sheets-Sheet 3

Inventor
Carl G. Biro
By Janet G. Crampton
Attorney

Patented May 18, 1937

2,081,033

UNITED STATES PATENT OFFICE 2,081,033

MEAT CUTTING AND SLICING MACHINE

Carl G. Biro, Marblehead, Ohio

Application February 27, 1936, Serial No. 66,071

8 Claims. (Cl. 143—17)

My invention has for its object to provide, in a band saw meat cutting machine, means that coact with the band saw to produce efficient meat cutting and slicing, and comprising means for producing a relation of pressures between the saw and its supporting pulley wheels that will automatically maintain the saw in substantially constant relation with respect to the wheels, notwithstanding a considerable pressure against the saw that may be exerted by the user, and means for removing from the band saw adhesive material collected during the sawing operations, whereby the said relation of the saw to the wheels may be maintained and whereby maximum efficiency and duration of the band saw and reduction of maintenance cost may be produced, although the band saw is used by those unskilled in the operation and care of meat cutting machines. The invention thus relates to improvements in band saws and has for its object to improve the operation conditions of band saws.

The invention provides band saw pulleys that maintain a balanced relation of pressures on the band saw to produce a yielding, though rapidly increasing pressure to automatically maintain the saw in position on the pulley wheels when the relation is disturbed or unbalanced, notwithstanding an unusual pressure that may be produced by the user in a direction across the cutting edge of the band saw.

The invention also provides means for tilting the flanged, tapered pulley wheels to locate their axes at an angle to each other to cause engagement of the rear or back edge of the saw at two diametrically disposed points on the flanges. Thus the back edge of the band saw is maintained removed from the said flanged part, except at the said points. The tapered form of the wheels produces a maximum frictional and rotative pressure substantially along the back edge part of the band saw, while practically no pressure is exerted on the toothed edge of the saw.

The invention also provides for removal and ready replacement of one of the pulley wheels to enable removal of material that is collected from the meat by the band saw and deposited on the surface of the wheel where it will form a hardened film and cause slippage of the saw lengthwise of the saw and crosswise the periphery of the wheel.

The invention also provides a band saw cleaner for removing oleaginous and glutinous material that collects on the band saw during saw operations which eventually clogs parts of the band saw and covers the wheel, thereby preventing the automatic control of the band saw and reducing the efficiency thereof.

The invention also provides a hand protector for protecting the user's hand in the sawing operation.

The invention consists in other features and advantages which will appear from the following description and upon examination of the drawings. The invention may be contained in structures of different forms, and to illustrate a practical application of the invention, I have selected a meat sawing machine as an example of the various forms of construction that may contain the invention. The particular structure selected as an example is described in detail hereinafter and illustrated in the drawings.

Figures 7, 9:
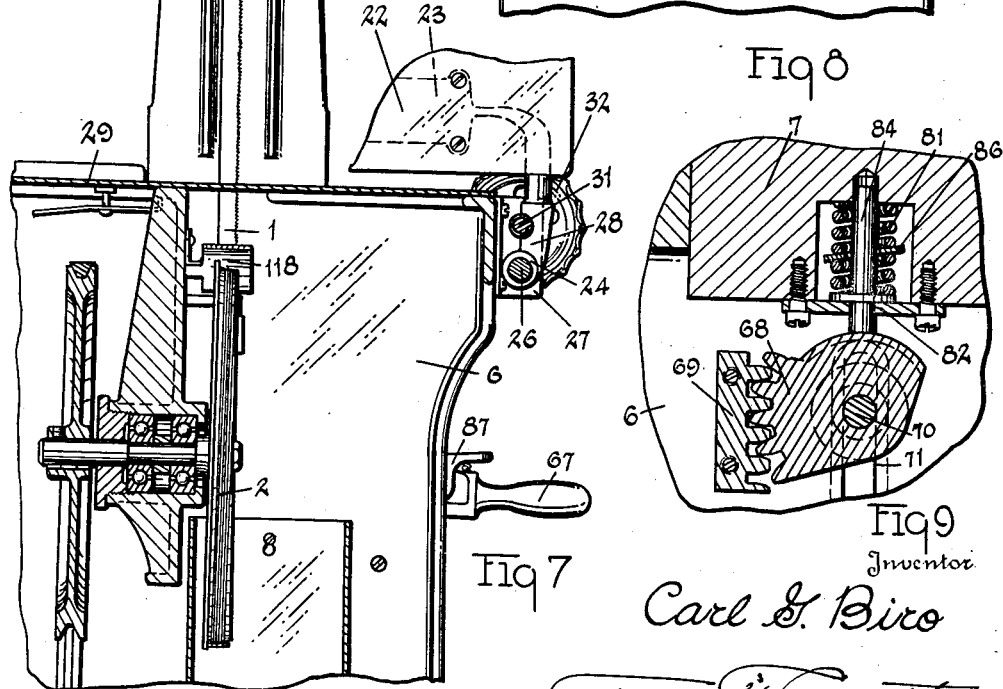

Fig. 1 illustrates a transverse vertical section of the meat cutting and slicing machine selected as an example of the various embodiments of my invention. Fig. 2 illustrates a saw cleaning means for removing meat and bone material that adheres to the saw. Fig. 3 illustrates an enlarged view of a part of one of the wheels by which the saw is moved or guided. Fig. 4 is a top view of a base part of the machine. Fig. 5 illustrates a means for resiliently operating a part of the saw cleaning means. Fig. 6 illustrates an end view of a stub-axle bearing in which one of the wheels is rotatably supported. Fig. 7 illustrates a view of a vertical longitudinal section of a part of the machine. Fig. 8 illustrates a means for adjusting the tension of the band saw. Fig. 9 illustrates a section of a part of the means illustrated in Fig. 8.

In the particular form of construction shown, a band saw 1 is rotatably supported and guided by a pair of tapered wheels 2 and 3. The wheel 2 is driven by a suitable motor, such as the motor 4, partly shown in Fig. 4. The wheel 2 drives the band saw 1, while the wheel 3 guides the band saw in a manner well known in the art. The wheels and the driving means, such as the motor 4, are supported on a frame comprising the base 6 and the standard 7. The wheel 2 is supported in the base 6, and the wheel 3 is supported on the standard 7 in a suitable housing or head that may be closed by a cover plate 9.

During the sawing operation the meat is located upon a plate 8 that is provided with the rollers 10 rotatably connected to depending brackets 11 extending downwardly from the plate 8 and movable in channeled members 12 supported, one on brackets 13, and the other on the base part 6 of the machine. The brackets 13 are secured to the base 6. The rollers 10 may be provided with suitable ball bearings to enable free horizontal movements of the plate 8 in a direction transverse to the band saw. Suitable limiting stops, such as the stops 14 and 16, may be provided for limiting the extent of movement of the plate 8. Two of the stops are located on the plate, one on one of the brackets 13, and the other on the base 6.

The plate 8 is provided with an upturned forward end part 17 to provide a vertical surface for engaging the meat to maintain the meat in position on the plate and to insure movement of the meat with the plate in a direction transverse to the band saw. The end of the upturned portion 17 is provided with a block 18. It extends toward the plane of a side surface of the band saw, so as to be located in close relation thereto when the upturned portion 17 of the plate moves past the band saw. The block operates to press that portion of the meat located in close proximity to the band saw toward the saw, particularly at the finish of the cut. The block is formed of a composition material that is highly resistant to wear. The block extends vertically and has a length substantially the height of the upturned portion 17 and a thickness that is relatively pronounced, which causes the user to sub-consciously realize the proximity of a part of his hand to the saw when it is brought into contact with the block 18. The block 18 thus affords a protection as against injury to the user of the machine.

When it is desired to slice meat, the thickness of the slices may be regulated or may be made uniform by a slice regulating plate 22 that is supported on an arm 23. The arm 23 is provided with a boss 24 that may be bored, and a guide rod 26 may be located in the bore and secured to the base 6 by means of suitable brackets 27. The arm 23 is also provided with a suitable boss 28 preferably formed substantially semi-cylindrical and having a thread cut on its concave semi-cylindrical surface. A rod 30 is rotatably supported in the brackets 27 and located above the rod 26. The rod 30 is provided with a threaded portion 31 that engages the threaded concave surface of the semi-cylindrical boss 28 when the arm extends above the rod 26 to locate the arm 23 in an overhanging position with reference to the top 29 of the base 6. Thus, the plate 22 may be shifted to any position across the table top along the rod 26, and when the threaded boss 28 engages the thread 31 of the rod 30, the plate 22 may be accurately adjusted by rotation of the rod 30. The rod 30 may be provided at one end with a handle or hand wheel 32 to enable convenient rotation of the rod 30 to adjust the plate 22 with reference to the band saw 1 whereby the thickness of the slices may be varied with accuracy, as may be desired. If desired, the plate 22 may be swung from above the base and held suspended on the rod 26 and out of the way. When it is desired to produce slices of desired thickness, it may be swung into position and adjusted by rotation of the rod 30.

The wheels that operate and guide the band saw are so constructed as to maintain the band saw in what may be termed a substantially free floating position and thus produce maximum efficiency and durability of the meat cutting and slicing machine. The parts of the wheels are so formed that when the band saw is subjected to sawing pressure, it produces forces that counteract any pressures that tend to displace the saw from its relatively free floating position during its movement by the wheels. When any pressure tending to deflect the saw from its normal position occurs, it is counteracted by rapidly increasing force that tends to maintain the saw in its normal position.

The wheels 2 and 3 are provided with flanges 33 and 34, and the surfaces 36 that are engaged by the band saw 1 are tapered to produce a slope of the surfaces towards the axis of 0.003 of an inch per inch of width of the surface of the wheel that is engaged by the band saw, or a taper of 0.006 of an inch per inch width of the surface of the wheel. The surface of the wheel engaged by the band saw is about 5/8 of an inch wide, and the slope of the surface relative to the axis of the wheel of about 0.002 of an inch, or a taper of 0.004 of an inch is produced. The wheels are tilted to locate the more remote lines of intersection of the plane of the axes of the wheels with the surfaces 36 of the wheels parallel to each other. Thus, the wheels are so located in their bearings that, although the surfaces 36 are tapered, the intersection of the plane of the axes of the wheels with the surfaces at the top of the wheel 3 and at the bottom of the wheel 2 will be located parallel. In other words, the axes are inclined towards each other on the rear sides of the wheels. This locates the flanges 33 and 34 so that the rear edge of the saw will be located closer to the flanges at the delivery and receiving points of the band saw on each of the wheels, namely, the points that are located in horizontal planes extending through the axes of the wheels, and the back edges of the saw will be located increasingly remote from the flanges of the wheel as the top and bottom portions of the wheel are approached. Thus, any pressure exerted in the meat sawing operation that may tend to force the band saw rearwardly will tend to push the band saw towards the larger diameter of the sloping surface, particularly in the vicinity of the point of delivery of the band saw from the upper wheel and the point of receipt of the band onto the lower wheel, while the substantially horizontally disposed parts of the bottom and top of the wheels 2 and 3, respectively, and the tension to which the band saw is subjected to hold the flat side surface of the band saw against the horizontally disposed surfaces, and yieldingly resist deflection at the part of the band saw where it engages the meat. Thus, a yielding counteracting force is produced that tends to maintain the saw in its normal position.

Also the lateral surfaces 37 of the flanges 33 and 34 contiguous to the tapered surface 36 are joined to the tapered surface 36 by a curved convex surface 38. The surface 38 may be engaged by the back edge of the saw, if and when the saw is deflected from its normal position by pressure of the meat on the saw which produces a tendency to spread the parts of the band saw located at diametrically opposite points with respect to the axes of the wheels that produces a counteracting resilient force that tends to return the band saw to its normal position as determined by horizontally disposed bottom and top portions of the surfaces 36 of the wheels 2 and 3. The tapered wheels operate to produce maximum frictional engagement between the surfaces 36 and the edge portions of the band saw remote from the teeth and produce a pressure that is substantially nil along the toothed edge of the band saw. Also, to counteract all tendency to forward slippage by reason of the tapered form of the surface 36 of the wheels 2 and 3, the surfaces 36 may be provided with V-shaped spiral grooves 41 that extend from the forward edge of each of the wheels rearwardly toward the flanges with respect to the direction of rotation of the wheels. The grooves operate to frictionally urge the saw rearwardly toward the flanges and reduce the tendency toward the outward slippage, which is greatly increased when the wheel or the saw blade becomes covered with a glutinous or an oleaginous material that is produced in sawing through the bone, marrow, and fats of the meat. These materials form a hardened film that tends to build up and produce a band saw engaging surface that departs from the tapered surface of the wheels. The helical V-shaped edges of the grooves tend to cut through the film-forming materials and maintain a metal-to-metal engaging area and reduce the slippage caused by the materials that are transmitted from the band saw to the wheel, although band saw cleaners are provided for the removal of greater bulk of such materials from the band saw.

The wheel 2 and its connecting mechanism is fixedly supported in the base 6 so as to locate the axis of the wheel at a desired angle with respect to the parts of the base, such as the table top 29 or the lower ends of the supporting legs 42 or other plane of reference. The upper wheel 3 is keyed to the stub-axle 43 that is rotatably supported in a bearing block 44. The bearing block has an end part 46. Preferably, a lower part of the end bearing block is rectangular in form, and the upper part is cylindrical as at 47. The head 48 of the standard 7 is provided with a ledge 50 that protrudes rearwardly and a bracket 51 that also protrudes rearwardly. The bracket 51 is bolted to the head and has a curved edge part 52 extending in a direction cross-wise the axis of the wheel 3 and below the bearing block 44. The rectangular formed end part of the block 44 is provided with a groove 53 preferably conforming to the surface of the edge part 52 of the head and forming a pivot line for pivotally supporting the said bearing block. The bracket 51 is provided with a bolt 54 located at the outer end of the bracket and in position to engage the rear end of the block. A lock-nut 56 is located on the bolt 54 for locking the bolt in the position to which it may be turned. The protruding ledge 50 of the head 48 of the standard is also provided with a bolt 57 for engaging the bearing block 44 at a point diametrically opposite the point of engagement of the bearing block by the bolt 54. Thus, the inclination of the stub axle 43 to the horizontal or any plane of reference, may be adjusted, preferably factory-adjusted or adjusted by an expert service man, by means of the bolt 54. The bolt 54 may be secured in its position by the locking nut 56, and the bolt 57 may be used for clamping the bearing block against the accurately set bolt 54.

The band saw 1 may be removed from the wheel 3 upon lowering of the standard 7, and the wheel may be readily removed by merely unscrewing the bolt 57, whereupon the bearing block 44 may be lifted from the supporting edge part 52 and withdrawn from the head. The wheel may thus be conveniently and thoroughly cleaned. This is desirable in view of the hard film-like formation produced by the materials that are collective from the meat on the wheel during successive sawing operations. When the wheel has been cleaned, it may be accurately located in the required factory-adjusted position by merely inserting the bearing block 44 in position and clamping the block by the bolt 57. Preferably, the head 48 is provided with a substantially rectangular opening 58 corresponding in form and fitting parts of the substantially rectangular end part 46 of the bearing block 44. To allow for removal of the bearing block from the curved edge 52 of the head 48, the vertical dimension of the opening 58 may be slightly greater than the vertical dimension of the said end of the bearing block. The side edges 61 of the opening 58 substantially fit the sides of the forward end of the bearing block to prevent any lateral play. The tension of the band saw produces a pressure on the wheel 3 that securely holds the forward end of the bearing block in position on the edge 52 that protrudes into the groove 53 of the bearing block.

To enable removal of the wheel 3, the standard 7, which is slidably supported in ways 63 formed at the side of the base 6 by the ridge 64 and the plates 66, is lowered to loosen the saw 1 whereby the saw may be readily slipped from the surface 36 of the wheel. When the wheel 3 is replaced in position and the saw located in engaging relation to the surface 36, the standard 7 is again raised relative to the base 6 to such a point as to produce the desired tension in the saw 1. In the form of construction shown, the standard is raised by means of a lever 67 having a sector gear 68 that may be formed integrally on one end of the lever. The sector gear meshes with the gear rack 69 secured to the side of the base 6. The lever 67 is provided with a pin 70 that is located substantially concentric to the sector gear and extends through a slot 71 formed in the side wall of the base 6. The pin 70 may be in the form of a bolt having a flat head 72 located in a recessed part 73 formed in the inside surface of the base 6. The recess and the slot are covered by means of the plate 74 that is secured to the wall by means of the stud bolts 76 whereby the pin 70 is slidably supported to extend at right angles to the outer surface of the side wall of the base 6 and is caused to move parallel to the line of the ends of the teeth of the gear rack 69 when the lever 67 is rotated. The end of the lever is also provided with a curved surface 77 which is preferably cylindrical in form and is coaxially located with respect to the pin 70 and the sector gear 68. The standard 7 is provided with an end part that engages the surface 77 whereby movement of the lever 67 and corresponding rocking movement of the sector gear relative to the rack will raise the standard 7 as the end part of the standard slides over the curved surface 77. Where the surface 77 is cylindrical in form, there is no wedging action as where a cam surface is used. When the lever 67 is rotated, it rotates the sector gear 68, and the sector gear being guided in its movements vertically by the slot 71 and the pin 70, the cylindrical surface is also raised vertically though rotatively, and the member engaged slides over the cylindrical surface as it is raised.

If desired, the cylindrical surface may engage the lower end of the standard. In the form of construction shown, a pin 78 is located in a recess 81 formed in the lower end of the standard, and a plate 82 is secured to the lower end of the standard to close one end of the recess 81. The pin 78 is provided with a suitable flanged part or a shouldered washer 83, and a spring 84 is located intermediate the washer and the end of the recess 81, whereby the pin 78 is yieldingly pressed outwardly by the spring 84. When the standard 7 is raised, the tension on the band saw is progressively increased according to the deformation of the spring 84 by the movement of the lever 67 that raises the pin 78.

If desired, a suitable tension indicating member 86 may be located intermediate two of the turns of the spring. The member may be so designed that when the pressure on the spring is such as to tightly clamp the member 86 between the turns, the pressure exerted is such as to cause a saw tension exceeding that to which the saw 1 should be subjected when in operation. The pressure on the spring 81 may be reduced until the member 86 is but slightly engaged, but rotatable between the turns as by the hand of the operator. This will indicate that the saw 1 is at about the desired tension. In order to secure the lever 67 in its adjusted position, a suitable spring pressed dog 87 may be pivotally supported on the lever 67, and a ratchet 88 may be located on the base to be engaged by the dog 87 at any one of a number of points according to the positions in which the standard 7 is to be held, both when it is lowered to remove the band saw 1 from the wheel 3 and raised to subject the saw to the desired tension.

To remove a greater portion of the material that collects on the band saw during sawing operations, brushes 90 are located beneath the table top 29. The brushes are cylindrical in form and are provided with spindles 92. The spindles are rotatably supported in sockets or sleeves 93, and the sleeves are supported in brackets 94 that are secured to parts of the base 6, and so as to support the spindles 92 and the axes of the cylindrical brushes 90 in an inclined relation with respect to edges of the saw. The axes of the cylindrical brushes 90 are preferably inclined away from the saw in a forward direction. The brushes are located on opposite sides of the saw and are rotated by the movement of the teeth of the saw that engage the bristles. The bristles penetrate between the teeth of the saw where a large quantity of the material collects. They also operate to wipe into the corners formed by the leading edges of the teeth of the saw. Also they wipe the material from the toothed edge of the saw towards the center of the sides of the saw.

The material that collects on the side surfaces of the saw is largely removed by the rubbers 91 that are located below the brush 90. The rubbers 91 are pivotally supported on the pins 96 and 97 that extend through a side wall of the base 6. The pins 96 and 97 are suitably shouldered and are provided with washers 98 to provide for rotation of the pins 96 and 97. The edges of the rubbers are yieldingly pressed against the sides of the saw by the spring 101 having end parts 102 that extend through holes formed in the ends of the pins.

The rubbers are provided with relatively sharp edge portions 104 that are spring pressed by the spring 101 to engage the side surfaces of the saw 1 just below the brushes 90. The edge portions operate to scrape and remove from the side surfaces of the saw a large part of the material left by the brushes. The rubbers 91 are disposed so as to locate the contiguous scraping edges 104 one above the other to prevent pinching of the saw, and thus permit the saw to yield to the pressure that may be produced in the sawing operation.

The machine may be provided with suitable coacting guiding parts that cooperate to maintain the saw in position. Preferably the material of the parts that contact the saw to hold it in position is formed of a composition that will withstand the rubbing of the metal of the saw thereon. The guiding members may be rotatably supported or may be secured in position and slidably contact the saw when the saw is materially moved from its normal position. Thus, the head is provided with a slidable rod 106 that extends through an opening 107 formed in the head and is suitably frictionally clamped by a spring 108 to retain the rod 106 in position. The rod 106 may be provided with a head 111 having a suitable slot through which the saw passes and a suitable roller or composition block for holding the saw in position. Also, the table top may be provided with composition blocks 112 located on opposite sides of the saw, and the base may be provided with a bracket 113 on which is rotatably supported a roller 114 of composition material that engages the back edge of the saw when the saw is deflected from its normal position. Suitable rubbers, such as the rubbers or scrapers 116 and 117 may be, if desired, located on the base 6 and spring pressed against the wheels for removal of an excess of oleaginous or glutinous material from the wheels. If desired, a shield 118 may be removably secured to the base 6 by a suitable means above the lower wheel 2 to reduce the amount of material that would otherwise collect on the surface of the wheel 2 during a sawing operation.

I claim:

1. In a meat cutting and slicing machine, a band saw, a pair of pulley wheels having tapered surfaces for supporting the saw, a flange located along the edge of each tapered surface having the greater diameter and in a plane at right angles to the axis of rotation of the wheel, and means for adjustably securing the axes of the wheels in tilted positions to locate the more remote lines of intersection of the vertical plane of the axes of the wheels with the tapered surfaces, parallel.

2. In a meat cutting and slicing machine, a band saw, a pair of pulley wheels having tapered surfaces for supporting the saw, a flange located along the edge of each tapered surface having the greater diameter and in a plane at right angles to the axis of rotation of the wheel, each tapered surface having a groove extending helically from an outer edge of the tapered surface toward the flange of each wheel with reference to the rotation of the wheel, the wheels having curved concave surfaces connecting the tapered surfaces and the surfaces of the flanges contiguous to the tapered surface, and means for locating the more remote lines of intersection of the vertical plane of the axes of the wheels with the tapered surfaces parallel.

3. In a meat cutting and slicing machine, a band saw, a pair of pulley wheels having tapered surfaces for supporting the saw, a flange located along the edge of each tapered surface having the greater diameter and in a plane at right angles to the axis of rotation of the wheel, each tapered surface having a groove extending helically from an outer edge of the tapered surface toward the flange of each wheel with reference to the rotation of the wheel, the wheels having curved concave surfaces connecting the tapered surfaces and the surfaces of the flanges contiguous to the tapered surfaces, and means for adjustably securing the axes of the wheels in tilted positions to locate the more remote lines of intersection of the vertical plane of the axes of the wheels parallel with the tapered surfaces to counter-balance the effect of the tapered surfaces of the wheels on the band saw and produce the maximum frictional pressure and propelling engagement of the wheel by contact of large portions of the edge part of the band saw remote from the teeth with the wheels.

4. In a meat cutting and slicing machine, a band saw, a pair of pulley wheels having tapered surfaces for supporting the saw, a flange located along the edge of each tapered surface having the greater diameter and in a plane at right angles to the axis of rotation of the wheel, each surface having a groove extending helically from an outer edge of the tapered surface toward the flange of each wheel and in a circular direction opposite to the rotation of the wheel, and means for adjustably securing the axes of the wheels in tilted positions to locate the more remote lines of intersection of the vertical plane of the axes of the wheels with the tapered surfaces parallel.

5. In a meat cutting and slicing machine, a band saw, a pair of pulley wheels having tapered surfaces for supporting the saw, the smaller ends of the wheels located on the same side of one of the edges of the saw, a stub-axle connected to one of the wheels, a bearing block for rotatably supporting the stub-axle, means for adjustably securing the block to secure the axis of the stub-axle and the wheel connected thereto in a tilted position relative to the axis of the other wheel to locate the more remote lines of intersection of the vertical plane of the axes of the wheels with the tapered surfaces parallel.

6. In a meat cutting and slicing machine, a band saw, a pair of pulley wheels having tapered surfaces for supporting the saw, the smaller ends of the wheels located on the side of the saw on which the cutting edge is located, each surface having a groove extending helically from the smaller end of the tapered surface toward the other edge of the surface and in a circular direction opposite to the rotation of the wheels, a stub-axle connected to one of the wheels, a bearing block for rotatably supporting the stub-axle, means for adjustably securing the block to secure the axis of the stub-axle and the wheel connected thereto in a tilted position relative to the axis of the other wheel to locate the more remote lines of intersection of the vertical plane of the axes of the wheels with the tapered surfaces parallel.

7. In a meat cutting and slicing machine, a band saw, a pair of pulley wheels having tapered surfaces for supporting the saw, the smaller ends of the wheels located on the outside of the toothed edge of the saw, a stub-axle connected to one of the wheels, a bearing block for rotatably supporting the stub-axle, the machine having fixed parts fitting the sides of the block, means for clamping the block for securing the axis of rotation of the stub-axle in a position to locate the more remote lines of intersection of the vertical plane of the axes of the wheels with the tapered surfaces parallel.

8. In a meat cutting and slicing machine, a band saw, a pair of pulley wheels having tapered surfaces for supporting the saw, a stub-axle connected to one of the wheels, a bearing block for rotatably supporting the stub-axle, the machine having an opening for fitting the sides of the block and means for pivotally supporting the block, means for factory adjusting and securing the block, means for clamping the block in its factory adjusted position to definitely locate the more remote lines of intersection of the vertical plane of the axes of the wheels with the tapered surfaces parallel and enable ready removal and replacement of the block and the wheel supported by the block and maintain the wheels in the said definite location.

CARL G. BIRO.